United States Patent
Temkin (10) Patent No.: US 8,878,505 B2
(45) Date of Patent: Nov. 4, 2014

(54) METHODS AND SYSTEMS TO CONVERT A PULSE POWER DEMAND TO A CONSTANT POWER DRAW

(75) Inventor: Deanna K. Temkin, Silver Spring, MD (US)

(73) Assignee: The Johns Hopkins University, Baltimore, MD (US)

(*) Notice: Subject to any disclaimer, the term of this patent is extended or adjusted under 35 U.S.C. 154(b) by 290 days.

(21) Appl. No.: 13/532,891

(22) Filed: Jun. 26, 2012

(65) Prior Publication Data

US 2013/0147444 A1    Jun. 13, 2013

Related U.S. Application Data

(60) Provisional application No. 61/569,381, filed on Dec. 12, 2011.

(51) Int. Cl.
*G05F 1/00*    (2006.01)

(52) U.S. Cl.
USPC .......................................... 323/283; 323/282

(58) Field of Classification Search
USPC .............. 363/35, 65; 323/222, 266, 282–285
See application file for complete search history.

(56) References Cited

U.S. PATENT DOCUMENTS

| | | | |
|---|---|---|---|
| 3,383,579 A | 5/1968 | Hung | |
| 4,272,692 A | 6/1981 | Morse | |
| 4,743,834 A | 5/1988 | Rice | |
| 4,806,937 A | 2/1989 | Peil | |
| 6,856,283 B2 | 2/2005 | Jacobson et al. | |
| 6,961,665 B2 | 11/2005 | Slezak | |
| 7,042,203 B2 * | 5/2006 | Van Der Horn et al. | 323/285 |
| 7,102,442 B2 | 9/2006 | Anderson | |
| 7,466,748 B2 | 12/2008 | Rauer et al. | |
| 2011/0006969 A1 * | 1/2011 | Batikoff et al. | 343/904 |

* cited by examiner

*Primary Examiner* — Nguyen Tran
(74) *Attorney, Agent, or Firm* — Aisha Ahmad (57) ABSTRACT

Methods and systems to translate a pulse power demand of a pulse load to a constant power draw, and to maintain a desired peak output voltage over time. A power converter (PC) provides power from a power source to a charge store, which provides pulse power to the load. A PC controller continuously monitors an output current of the PC and an output voltage of the charge store, and controls the PC to draw constant power from the source, at a level indicated by a power command. A peak voltage controller periodically adjusts the power command, such as to compensate for time-varying effects, based on a peak voltage reference and the output voltage of the charge store measured at times of synchronization pulses. The peak voltage controller generates the synchronization pulses based on rising edges of a pulse current, or receives the synchronization pulses from the radar system controller.

16 Claims, 12 Drawing Sheets

```
if (t<0.001)
    out[0]=0;                          } 402 if (in[1] < 0.9)
    n=1;                               } 404 if (in[1] >0.9 && n==1) {
    n=2;                               } 406 if (in[0]>33.25)
    out[0]=in[2]-0.5;                  } 408 if (in[0]>34)
    out[0]=in[2]-1;                    } 410 if (in[0]>35)
    out[0]=in[2]-1.5;                  } 412 if (in[0] > 36 && in[2] > 0)
    out[0]=0;                          } 414 if (in[0] < 32.75)
    out[0]=in[2]+0.5;                  } 416 if (in[0] < 32)
    out[0]=in[2]+1;                    } 418 if (in[0] < 31)
    out[0]=in[2]+1.5;                  } 420 if (in[0] < 30 && in[2]<0)
    out[0]=0;
}                                      } 422 if (t<0.001)
    out[0]=0;
```

METHODS AND SYSTEMS TO CONVERT A PULSE POWER DEMAND TO A CONSTANT POWER DRAW

CROSS REFERENCE TO RELATED APPLICATIONS

This application claims the benefit of U.S. Provisional Patent Application Ser. No. 61/569,381, filed Dec. 12, 2011, which is incorporated herein by reference in its entirety.

STATEMENT OF GOVERNMENTAL INTEREST

This invention was made with U.S. Government support under Naval Sea Systems Command (NAVSEA) contract number N00024-D-6606. The U.S. Government has certain rights in the invention.

BACKGROUND

1. Technical Field

Disclosed herein are methods and systems to regulate a power converter to draw a constant power level from a power source to a charge store, which provides pulsed power to a pulse load such as a radar system, and methods and systems to maintain a desired peak output voltage of the charge store such as to accommodate time-varying effects.

2. Related Art

A radar system presents periodic and instantaneously-high current pulse loads to a power source or an upstream power bus.

The pulse load may result in large ripple currents on the power source or upstream power bus, which may impact power quality for other loads. Where the power source includes a generator, such as with ship-based, tactical, or transportable radar, large ripple currents may cause instability and mechanical stresses on the generator.

SUMMARY

Disclosed herein are methods and systems to translate a pulse power demand of a pulse load, such as a radar system, to a constant power draw from a power source.

Also disclosed herein are methods and systems to maintain a desired peak output voltage to the pulse load over time, such as to compensate for time-varying effects that might otherwise alter the peak output voltage over time. Time-varying effects may include temperature changes and/or component aging.

A system may include a charge store to provide power to a pulse load, such as a radar system. The system may further include a power converter (PC) to provide power from a power source to the charge store, and a PC controller to continuously control the PC to draw constant power from the power source. The PC controller may control the PC based on a sensed output current of the PC, a sensed output voltage of the charge store, and a power command, which may represent a desired average power level.

The system may further include a peak voltage controller to periodically adjust the power command to maintain a peak output voltage substantially equal to a peak voltage reference.

The peak voltage controller may determine the peak output voltage based on the sensed output voltage of the charge store in synchronization to the start of the load pulse. The synchronization pulse may be generated on the rising edges of the pulse load current, or may be provided by the radar system controller.

The peak voltage controller may periodically adjust the power command at a frequency of the pulse load.

The peak voltage controller may vary an adjustment step size based on a magnitude of a difference between the peak output voltage and the peak voltage reference, and may adjust the power command by one of multiple step-sizes based on the magnitude of the difference.

The peak voltage controller may include a field-programmable gate array (FPGA) to compare the peak output voltage to one or more reference values.

Methods and systems disclosed herein are not limited to the above-summary.

BRIEF DESCRIPTION OF THE DRAWINGS/FIGURES

In the drawings, the leftmost digit(s) of a reference number identifies the drawing in which the reference number first appears.

DETAILED DESCRIPTION

Figure 1:
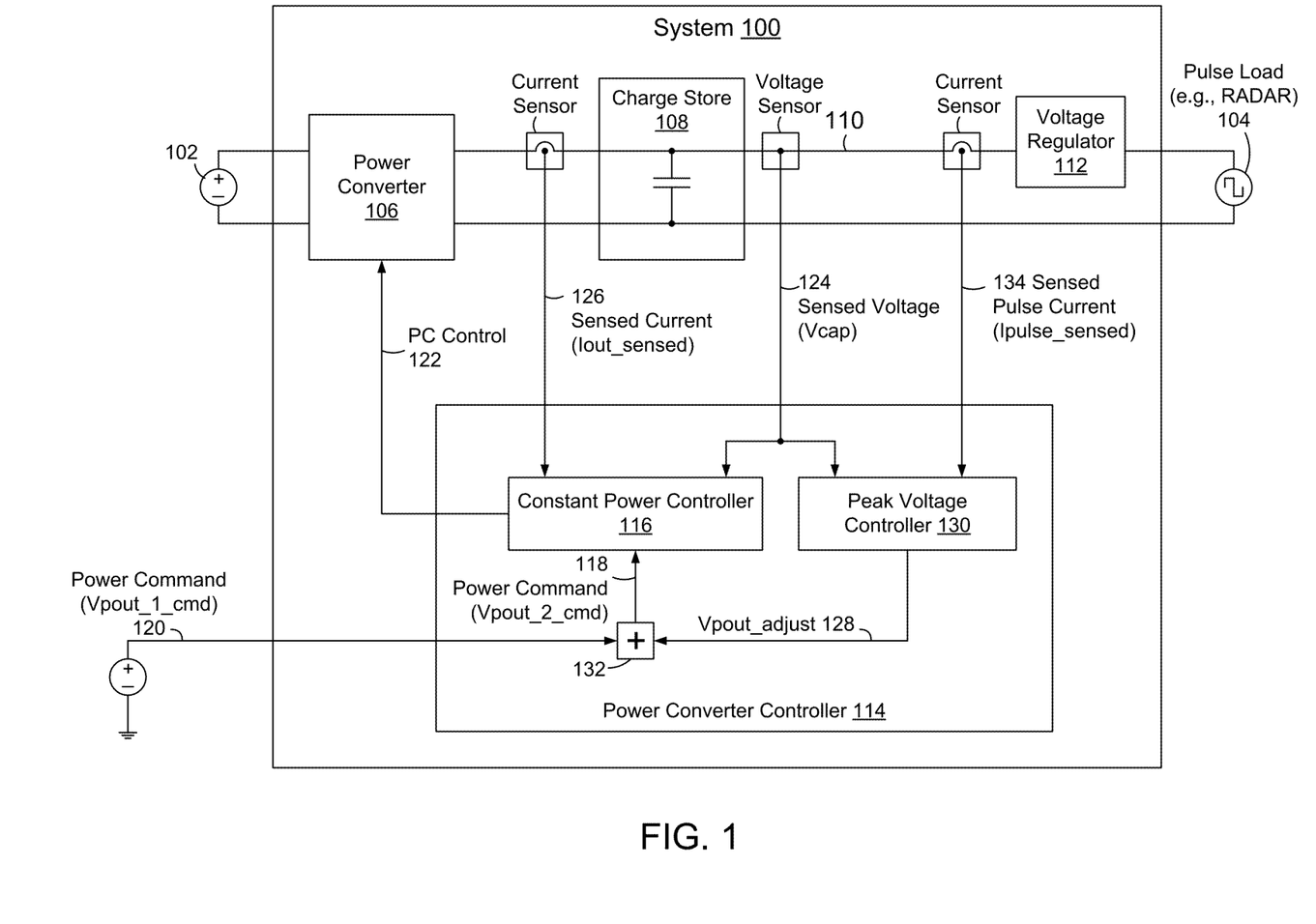
FIG. 1 is a block diagram of a system including a charge store, a power converter (PC), and a PC controller, to convert a pulse power demand of a pulse load to a constant power draw from a power source.

FIG. 1 is a block diagram of a system 100 to convert a pulse power demand of a pulse load 104 to a constant power draw from a power source 102.

For illustrative purposes, pulse load 104 is described herein with reference to a radar system. Pulse load 104 is not, however, limited to a radar system.

Power source 102 may include an alternating current (AC) source, and may include and AC/DC converter to convert AC power to direct current (DC) power.

System 100 includes a charge store 108 to provide pulsed power to radar system 104. Charge store 108 may include a capacitive storage system.

System 100 further includes a power converter (PC) 106 to provide power from power source 102 to charge store 108.

Pulse loading from radar system 104 may impart a triangular ripple voltage on top of a DC voltage at 110, having a ripple frequency equal to a pulse repetition frequency of a transmitted pulse train of radar system 104.

System 100 further includes a PC controller 114, including a constant power controller (CPC) 116 to control PC 106 to convert the pulse power demand of radar system 104 to a constant power demand on power source 102. PC 106 and PC controller 114 may protect source 102 from otherwise adverse effects of the pulsed loading of charge store 108.

In FIG. 1, CPC 116 provides a PC control 122 based on a sensed voltage 124 (Vcap) of charge store 108, a sensed current 126 (Iout_sensed) output from PC 106, and a desired or reference power level, illustrated here as a power command 118 (Vpout_2_cmd).

CPC 116 may adjust PC control 122 to increase the output current of PC 106 when Vcap decreases, and to decrease the output current of PC 106 when Vcap increases, in order to maintain output power of PC 106 substantially equal to Vpout_2_cmd.

Power command 118 may be based on a power command 120 (Vpout_1_cmd), which may represent a desired average power level. Power command 120 may correspond to the average power level for the next set of transmitted pulses for the radar system 104, and may be uploaded or received from a radar system controller.

Transmit pulses of radar system 104 may have constant and/or variable pulse widths. For both constant and variable pulse widths, when duty cycle of the transmit pulses is maintained constant, the power averaged over each pulse repetition interval is constant. When the power delivered by PC 106 is constant, the power drawn from power source 102 is also constant. The duty cycle of repetitive transmit pulses may be expressed as:

$$\text{Duty Cycle} = \frac{\text{Pulse Width }(t)}{\text{Pulse Repetition Interval }(t)} \qquad \text{EQ. (1)}$$

Where the pulse width and/or pulse repetition interval of radar system 104 change, power command 120 (Vpout_1_cmd) may change as well, such as described further below. When power command 120 is changed, a corresponding response time of system 100 is determined by a control bandwidth of PC 106.

In FIG. 1, PC controller 114 further includes a peak voltage controller 130 to generate an adjustment control 128 (Vpout_adjust), to maintain a desired peak output voltage of charge store 108. PC controller 114 further includes a module 132 to adjust Vpout_1_cmd based on Vpout_adjust. Peak voltage controller 130 is described further below with reference to FIGS. 3 and 4.

Figure 2:
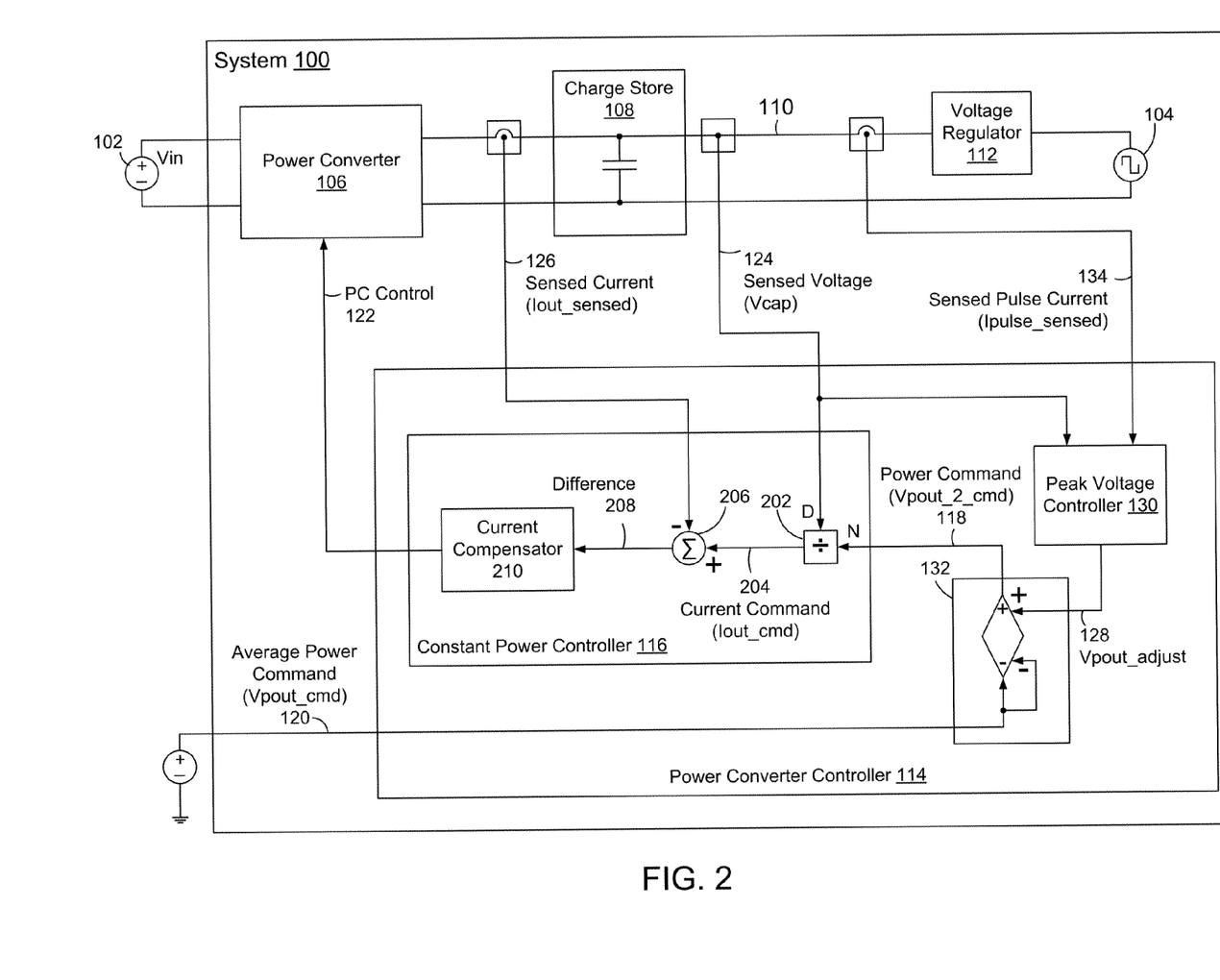
FIG. 2 is another block diagram of the system of FIG. 1, including an example implementation of the PC controller.

FIG. 2 is a block diagram of system 100, including an example implementation of PC controller 114.

In FIG. 2, CPC 116 includes a divider 202 to determine a desired current command 204 (Iout_cmd) as:

$$\text{Iout\_cmd} = V\text{pout\_2\_cmd}/V\text{cap}, \qquad \text{EQ. (2)}$$

where Vpout_2_cmd is the desired power command represented by a voltage level.

CPC 116 further includes a subtractor 206 to provide an error or difference 208 based on a difference between Iout_cmd and Iout_sensed.

CPC 116 further includes a current compensator 210 to adjust PC control 122 to reduce difference 208, to maintain the power of PC 106 substantially equal to Vpout_2_cmd.

Peak voltage controller 130 is now described.

In FIG. 1, peak voltage controller 130 controls Vpout_adjust 128 so that Vcap returns to a peak voltage reference value just prior to each new load pulse. When Vcap is too low, Vpout_adjust is increased. If Vcap is still too low at the next synch pulse, Vpout_adjust is further adjusted. This may be repeated until Vcap is at the peak voltage reference value. Conversely, when Vcap is above the peak voltage reference value, Vpout_adjust may be reduced.

Peak voltage controller 130 may compensate for time-varying effects that may impact peak voltage of charge store 108. Time-varying effects may result from environmental changes (e.g., temperature change) and/or component aging. As a result of such effects, the desired output power of PC 106 may not correspond to power command 120.

Peak voltage controller 130 may update adjustment control 128 (Vpout_adjust) once per transmit period of radar system 104. Vpout_adjust may thus be corrected or adjusted more frequently for short pulse repetition intervals than for long pulse repetition intervals. For extremely short pulse repetition intervals it may be desirable to update adjustment control 128 (Vpout_adjust) less frequently due to bandwidth limitations of the controls. The determination of the adjustment should be performed in sync with the start of a new transmit pulse.

CPC 116 may continuously monitor Iout_sensed, Vcap, and Vpout_2_cmd, and update PC control 122 as needed.

CPC 116 may be implemented substantially with analog circuit components, whereas peak voltage controller 130 may include analog components, digital components, and/or combinations thereof.

Figure 3:
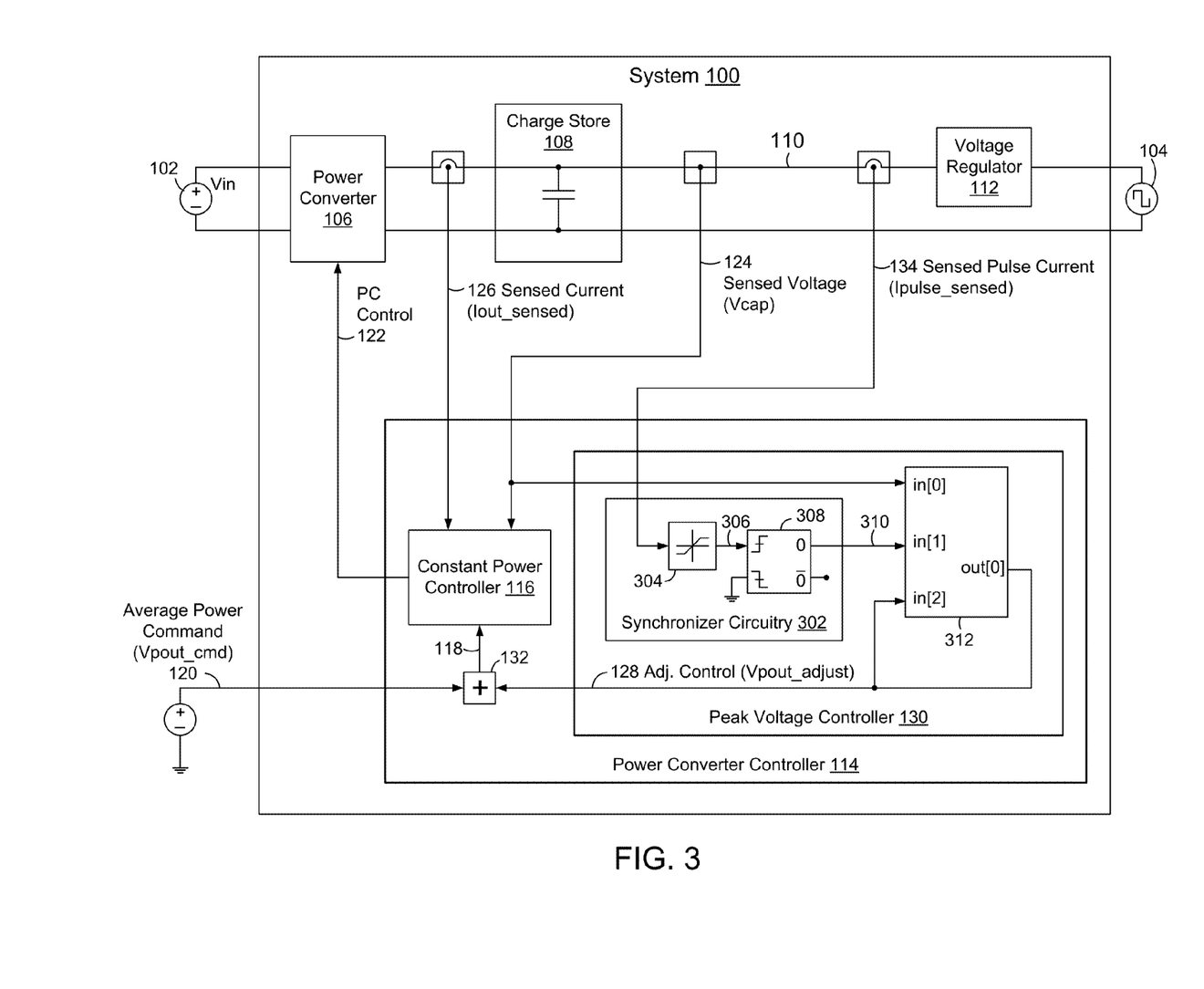
FIG. 3 is another block diagram of the system of FIG. 1, including an example implementation of a peak voltage controller.

FIG. 3 is a block diagram of system 100, including an example implementation of peak voltage controller 130.

In FIG. 3, peak voltage controller 130 includes synchronizer circuitry 302 to generate sync pulses 310 to indicate times at which Vcap is at a peak voltage. Synchronizer circuitry 302 generates sync pulses 310 based on rising edges of a sensed pulse current 134 (Ipulse_sensed). Synchronizer circuitry 302 may, for example, include a limiter circuit 304 to output an indication 306 when Ipulse_sensed exceeds a threshold value that corresponds to the beginning of a transmit pulse of radar system 104. Circuitry 302 further includes a register 308, such as a flip-flop, to register indication 306 as synch pulse 310 to a control system 312.

Alternatively, sync pulses 310 coincident with the start of the transmit pulse may be provided by radar system 104.

Control system 312 determines a peak voltage of Vcap based on a value of Vcap coincident with a sync pulse 310, compares the peak voltage to one or more reference values, and selectively adjusts Vpout_adjust based on a the comparison(s).

Peak voltage controller 130 may help to support long pulse operation for a variety of transmit intervals. For a long pulse, the output voltage of charge store 108 may droop before the end of the pulse. Peak voltage controller 130 ensures that that charge store 108 is always recharged to the same level, which ensures that all consecutive long pulse profiles will be the same, even if the output voltage droops. In other words, regulation of the peak output voltage helps to maintain quality of pulses during long pulse width transmissions, and provides consecutive long pulses with substantially identical energy.

Control system 312 may vary an adjustment step size of Vpout_adjust based on a magnitude of a difference between Vcap and a desired or peak voltage reference, and may adjust Vpout_adjust by one of multiple selectable step-sizes based on the magnitude of the difference, such as described below with reference to FIG. 4.

Figure 4:
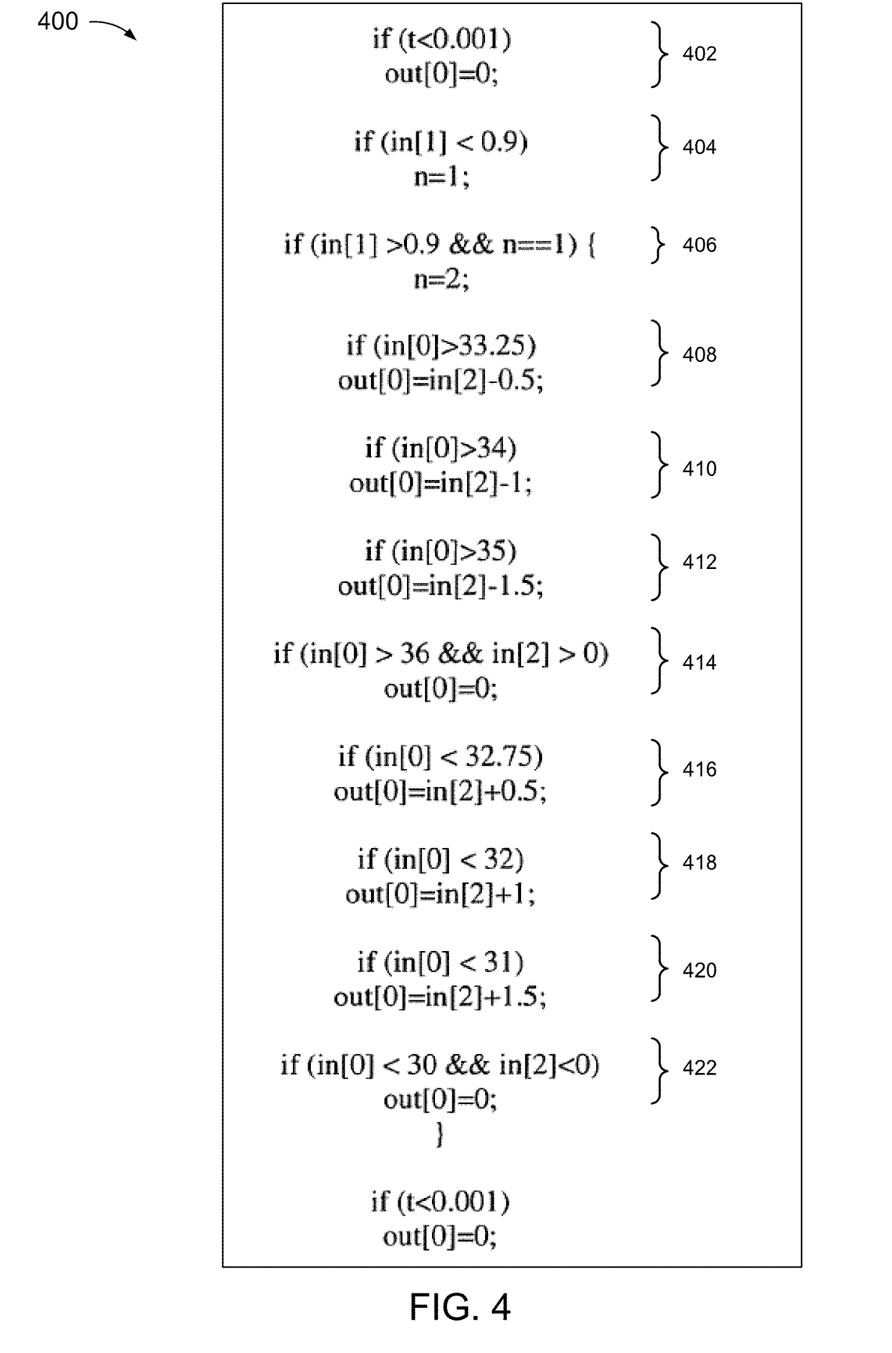
FIG. 4 is a depiction of logical operations that may be implemented by a peak voltage control system of FIG. 3.

FIG. 4 is a depiction of logical operations 400, which may be implemented by control system 312 in FIG. 3.

In FIG. 4:
in[0] corresponds to Vcap in FIG. 3;
in[1] corresponds to sync pulse 310 in FIG. 3;
in[2] corresponds to an existing value of Vpout_adjust in FIG. 3; and
out[0] corresponds to a new or updated value of Vpout_adjust in FIG. 3.

As described below, logical operations 400 maintain the peak voltage of Vcap between values of 32.75 and 33.25 (i.e., for a peak voltage reference value of 33). Methods and systems disclosed herein are not, however, limited to the examples of FIG. 4.

At 402, out[0] (Vpout_adjust), is initialized to 0. This may be performed upon a system initialization or power-up.

At 404, when in[1] (sync pulse 310) is below a sync pulse threshold value, a value n is set to 1 to indicate an that sync pulse 310 is inactive.

At 406, when in[1] (sync pulse 310) is above the sync pulse threshold value, n is set to 2 to indicate that sync pulse 310 is active.

In the example of FIG. 4, the synch pulse threshold value is set to 0.9. Methods and systems disclosed herein are not, however, limited to these examples.

When n=2 (i.e., synch pulse 310 is active), one or more of 408 through 422 are performed as described below.

At 408, when Vcap is greater than a reference value of 33.25, Vpout_adjust is decremented by a step size of 0.5.

At 410, when Vcap is greater than a reference value of 34, Vpout_adjust is decremented by a step size of 1.0.

At 412, when Vcap is greater than a reference value of 35, Vpout_adjust is decremented by a step size of 1.5.

At 414, when Vcap is greater than a reference value of 36, and Vpout_adjust is above zero, Vpout_adjust is reset to zero.

In other words, when Vcap exceeds the peak voltage reference value of 33, and as the magnitude of the difference between Vcap and the peak voltage reference value of 33 increases, Vpout_adjust is decremented with increasing step sizes. When the magnitude of the difference exceeds a difference threshold of 36−33=3, Vpout_adjust is reset to zero regardless of the existing value of Vpout_adjust. The difference threshold may correspond to an over-voltage condition, such as described further below.

Similarly, at 416 through 420, when Vcap is below the peak voltage reference value of 33, and as the magnitude of the difference between Vcap and the peak voltage reference value of 33 increases, Vpout_adjust is incremented with increasing step sizes (i.e., 0.5, 1.0, or 1.5). When the magnitude of the difference exceeds a second difference threshold of 33−30=3, Vpout_adjust is reset to zero regardless of the existing value of Vpout_adjust. The second difference threshold may correspond to an under-voltage condition.

Control system 312 may be implemented with integrated circuit (IC) logic, which may include a field-programmable gate array (FPGA), an application-specific integrated circuit (ASIC), and/or other IC devices. Control system 312 may further include an analog-to-digital converter (ADC) to quantize Vcap for comparison to one or more reference values, and may include a digital-to-analog converter (DAC) to output Vpout_adjust as an analog control.

As described further above with reference to FIG. 1, pulsed loading from radar system 104 may impart a ripple voltage on top of a DC voltage at 110, having a frequency equal to a pulse repetition frequency of a transmitted pulse train of radar system 104. System 100 may include a voltage regulator (VR) 112 to reduce and or eliminate the ripple voltage from the pulsed power provided to radar system 104.

As further described above, charge store 108 serves as an energy reservoir to provide pulse energy or power to radar system 104. Where a larger triangle ripple is allowed on capacitors of charge store 108, less capacitance is needed to provide the pulse energy. A maximum allowable ripple may be set based on a maximum voltage rating of the capacitors and an allowable input voltage range of VR 112 to maintain a regulated output. Total capacitance of charge store 108 may be determined based on the energy requirement of the longest anticipated pulse duration.

VR 112 may include a linear voltage regulator, and PC 106 may include a switching-based DC/DC converter such as described below with reference to FIG. 5. Alternatively, VR 112 and PC 106 may each include a switching-based DC/DC converter.

A switching frequency of a DC/DC converter is typically much higher than the ripple frequency due to radar pulse repetition frequency.

A power draw from power source 102 may be more stable where PC 106 and VR 112 are implemented as switching DC/DC converters, relative to a situation where VR 112 is implemented as a linear regulator. A switching DC/DC converter implementation of VR 112 may provide greater overall system efficiency.

Where VR 112 is implemented as a switching DC/DC converter, power command 120 may remain constant when the pulse width of radar transmissions change, provided that the duty cycle of the radar transmission is constant and an efficiency of the switching DC/DC converter is constant.

In a linear voltage regulator, average losses change with load pulse width. Thus, where VR 112 includes a linear regulator, the average voltage into the linear regulator varies as the pulse width varies. In order to maintain a constant power draw from power source 102 while maintaining a constant peak output voltage of charge store 108, power command 120 (Vpout_1_cmd) should change with changes in the load pulse width, even where the duty cycle of the pulse load is constant.

Figure 5:
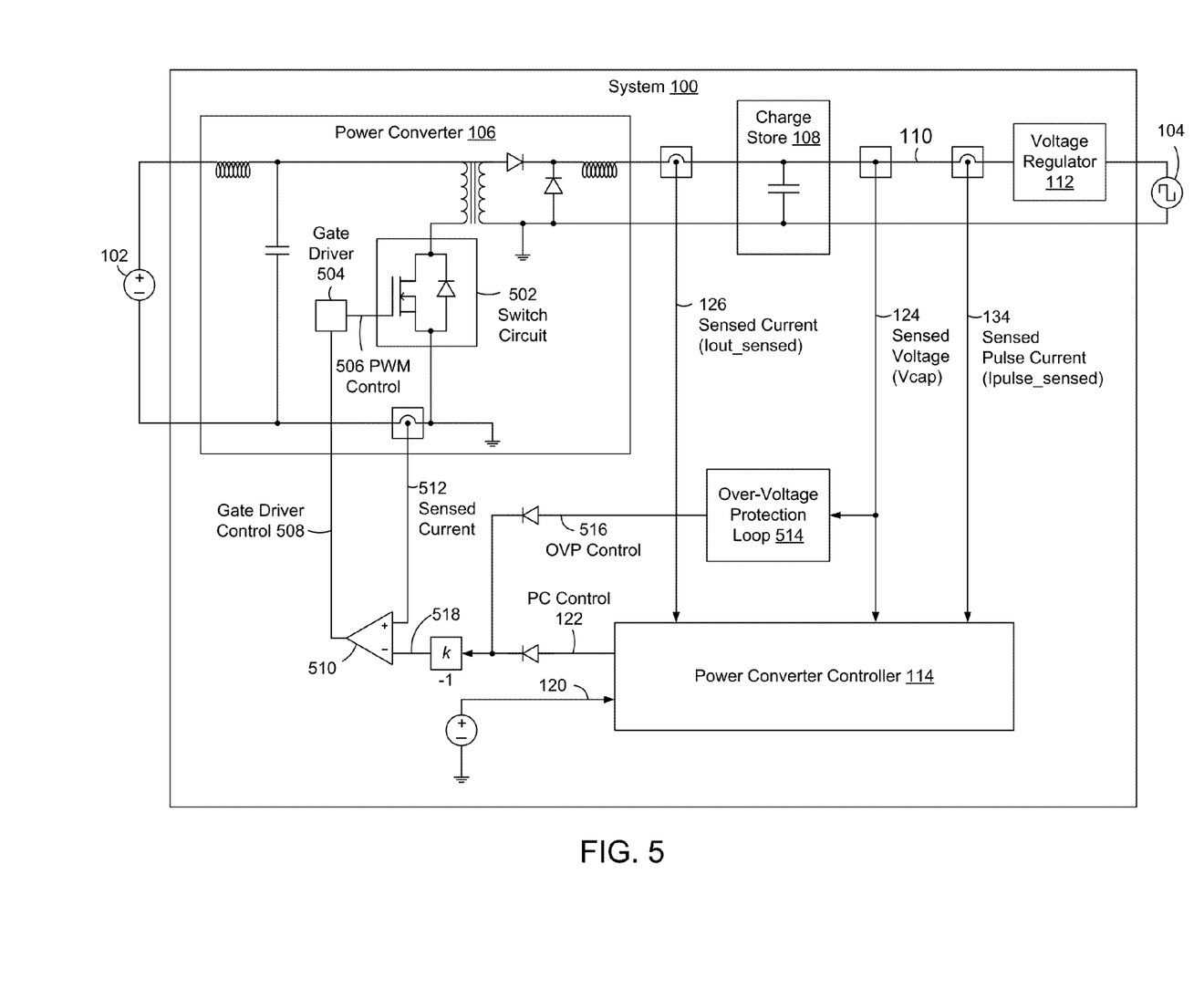
FIG. 5 is another block diagram of the system of FIG. 1, where the PC includes a switching DC/DC converter.

FIG. 5 is a block diagram of system 100, where PC 106 includes a switching DC/DC converter.

In FIG. 5, PC 106 includes a switch circuit 502 and a gate driver 504 to control on and off times of switch circuit 502, such as with a pulse width modulated (PWM) control 506. The output current of PC 106 is determined by a duty cycle of PWM control 506, which may be expressed as:

$$\text{Duty Cycle} = (502 \text{ ON Time})/(502 \text{ ON time} + 502 \text{ OFF time}). \quad \text{EQ. (3)}$$

Gate driver 504 is controllable with a gate driver control 508. In the example of FIG. 5, system 100 includes a comparator 510 to generate gate driver control 508 based on a difference a control 518 and a sensed current 512 of PC 106.

Control 518 may correspond to PC control 122, or may be generated from a combination of PC control 122 and one or more other controls.

For example, in FIG. 5, system 100 further includes an over-voltage protection (OVP) loop 514, which may be implemented as a relatively fast-acting or instantaneously-active loop. When Vcap reaches an OVP threshold, OVP loop 514 activates to provide an OVP control 516 to reduce the current output of PC 106. In this example, control 518 is generated based on a combination of PC control 122 and OVP control 516.

The OVP threshold may be set so that under normal operation, with relatively small differences between the desired output power of PC 106 and the actual output power of PC 106, OVP loop 514 is not activated. A voltage rating, and hence a voltage derating requirement of capacitors of charge store 108 may also be considered in setting the OVP threshold.

Where PC controller 114 includes peak voltage controller 130 (FIGS. 1, 2, and 3), the OVP threshold may be set higher than the peak voltage reference. In this example, OVP loop 514 may be activated to prevent Vcap from exceeding the OVP threshold, while peak voltage controller 130 continues to adjust Vpout_adjust to bring the peak value of Vcap to the peak voltage reference value.

Figure 6:
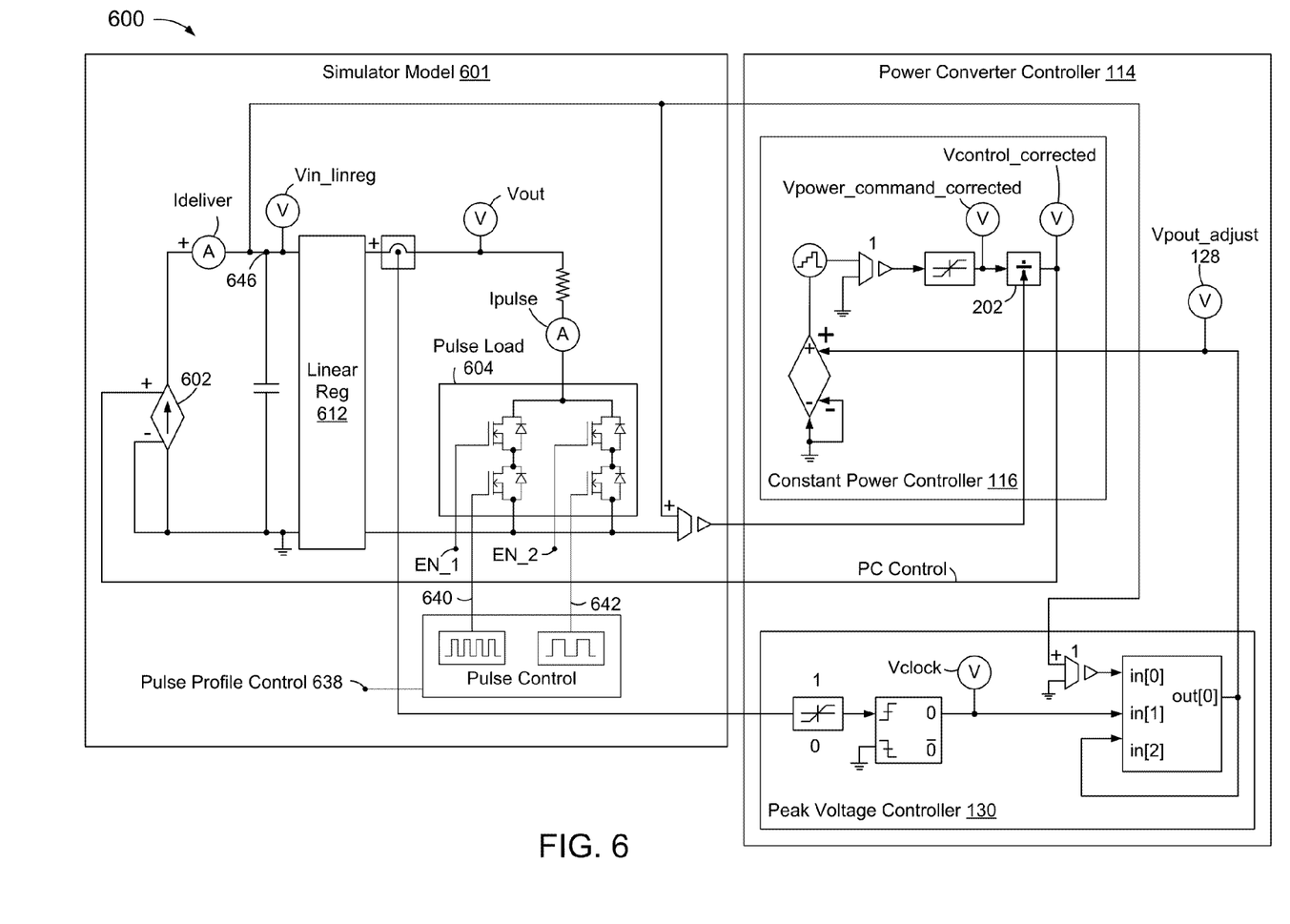
FIG. 6 is a block diagram of a simulation environment, including a simulator model and a PC controller.

FIG. 6 is a block diagram of a simulation environment 600, including a simulator model 601 and a PC controller 614. PC controller 614 includes a constant power controller (CPC) 616 and peak voltage controller 130. Simulator model 601 may be implemented to exercise and/or evaluate one or more features of PC controller 614.

Simulator model 601 includes a current source 602 in place of power source 102 and PC 106. Simulator model 601 further includes a linear voltage regulator 612 and a pulse load 604. Current source 602 may be implemented and/or simulated as an ideal current source, and pulse load 604 may simulate a radar system. Pulse load 604 is controllable with commands 638 to provide variable and/or multiple pulse loads or profiles.

FIGS. 7 through 25 are timing diagrams generated for simulation environment 600, in which a first repetitive pulse train 640 is applied at time t=zero, and a second repetitive pulse train 642 is applied at time t=2.017 seconds. First pulse train 640 has a pulse width slightly longer than a maximum pulse width that PC controller 614 can support without accruing a voltage droop. Second pulse train 642 has a pulse width that is sufficiently long to cause relatively significant droop in an output voltage 646 to linear regulator 612. In this example, two different power commands 638 are issued, one at time=0, the other at time t=2.017 seconds, corresponding to the two pulse profiles. Methods and systems disclosed herein are not, however, limited to these examples.

FIGS. 7 through 14 are timing diagrams generated with peak voltage controller 130 disabled to preclude adjustments for peak voltage errors. FIGS. 7 through 14 include curves for ideal conditions in which power commands 638 are configured to support the desired load pulses (blue curves). FIGS. 7 through 14 further include curves for non-deal, or error conditions in which power commands 638 are issued to provide 10% less power than needed to achieve the desired pulses (red curves). Each of FIGS. 7 through 14 is addressed below.

Figure 7:
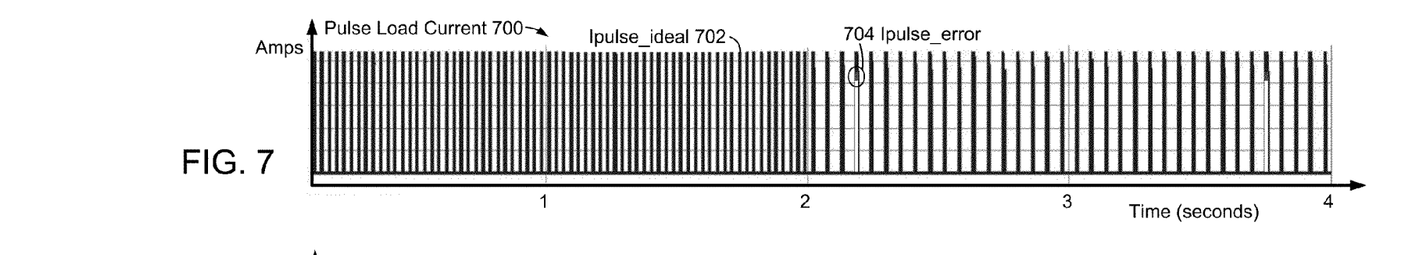
FIG. 7 is a timing diagram of pulse load current for the simulator environment of FIG. 6, with a peak voltage controller disabled.

FIG. 7 is a timing diagram 700 of pulse load current from time t=0 to time t=4 seconds, including an Ipulse_ideal 702, for which commands match the desired load condition, and an Ipulse_error 704, for which commands give 10% less average power than the desired load condition.

Figure 8:
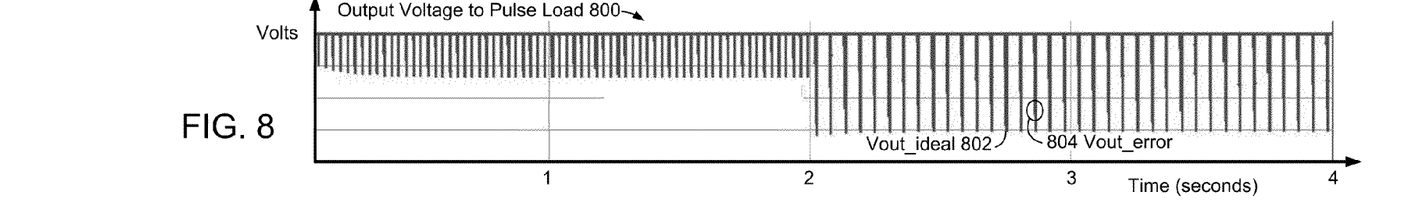
FIG. 8 is a timing diagram of output voltage to pulse load for the simulator environment of FIG. 6, with the peak voltage controller disabled.

FIG. 8 is a timing diagram 800 of output voltage to pulse load from time t=0 to time t=4 seconds, including a Vout_ideal 802 and a Vout_error 804.

Figure 9:
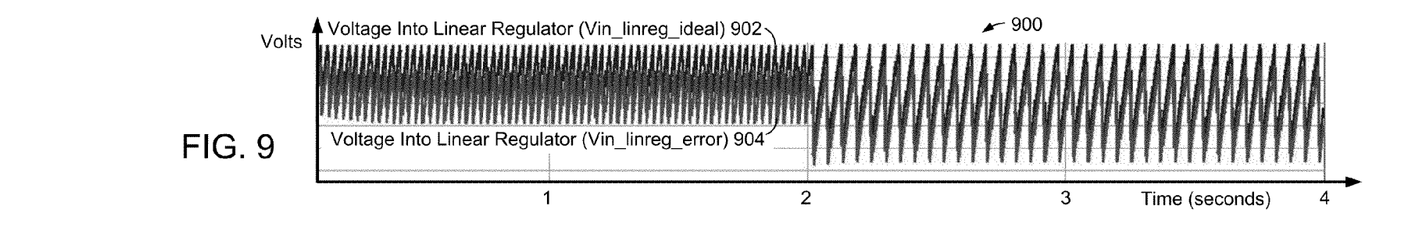
FIG. 9 is a timing diagram of voltage into linear regulator for the simulator environment of FIG. 6, with the peak voltage controller disabled.

FIG. 9 is a timing diagram 900 of voltage into linear regulator from time t=0 to time t=4 seconds, including a Vin_linreg_ideal 902 and a Vin_linreg_error 904.

Figure 10:
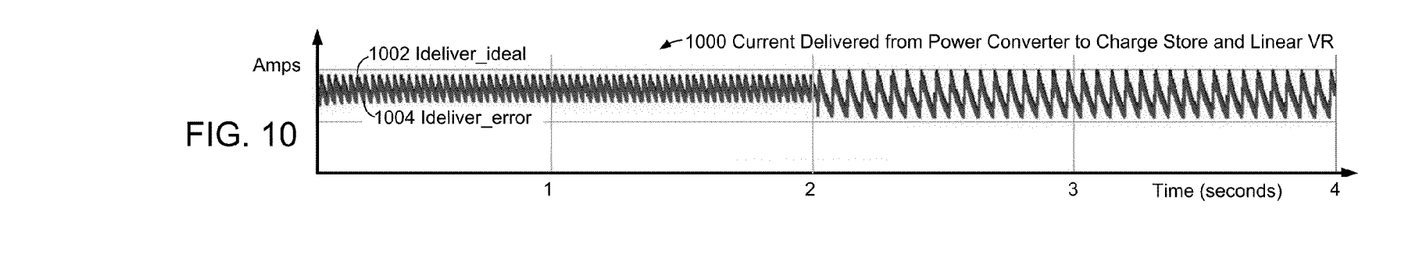
FIG. 10 is a timing diagram of current delivered from power converter to charge store and linear regulator for the simulator environment of FIG. 6, with the peak voltage controller disabled.

FIG. 10 is a timing diagram 1000 of current delivered from power converter to charge store and linear regulator from time t=0 to time t=4 seconds, including an Ideliver_ideal 1002 and an Ideliver_error 1004.

Figure 11:
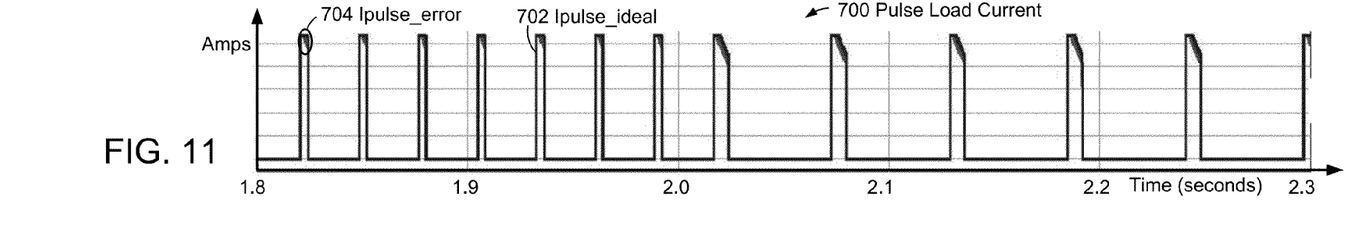
FIG. 11 is an expanded view of the timing diagram of FIG. 7.

FIG. 11 is an expanded view of timing diagram 700, centered about pulse profile transition time t=2.017 seconds.

Figure 12:
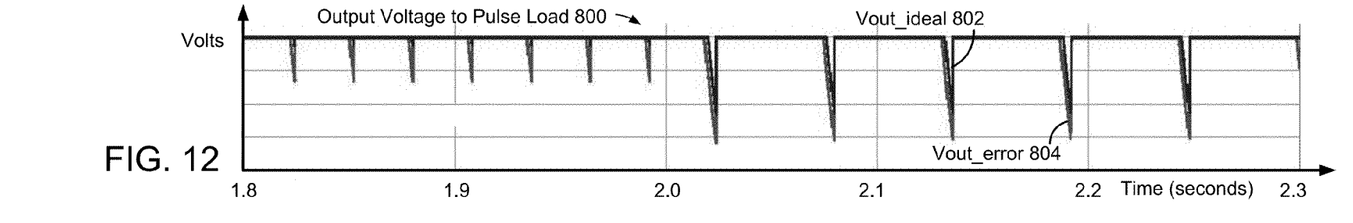
FIG. 12 is an expanded view of the timing diagram of FIG. 8.

FIG. 12 is an expanded view of timing diagram 800, centered about pulse profile transition time t=2.017 seconds.

Figure 13:
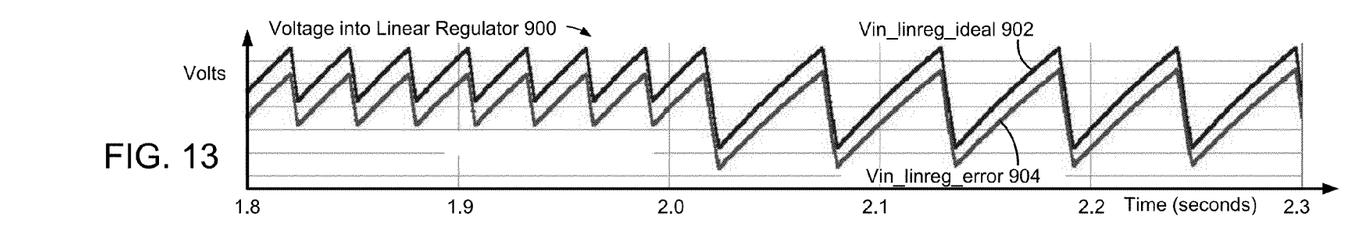
FIG. 13 is an expanded view of the timing diagram of FIG. 9.

FIG. 13 is an expanded view of timing diagram 900, centered about pulse profile transition time t=2.017 seconds.

Figure 14:
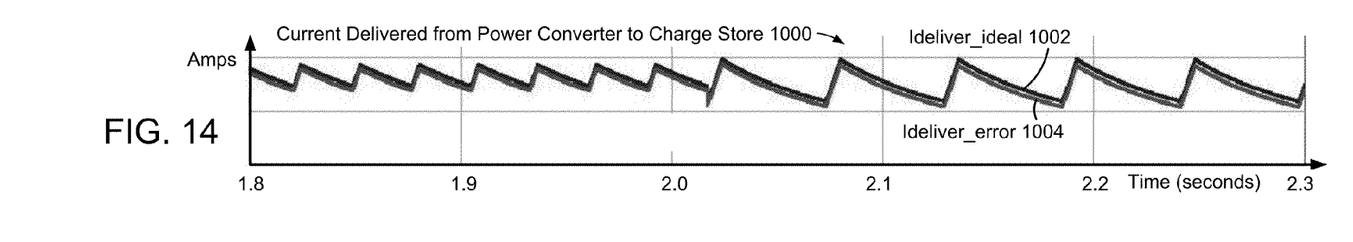
FIG. 14 is an expanded view of the timing diagram of FIG. 10.

FIG. 14 is an expanded view of timing diagram 1000, centered about pulse profile transition time t=2.017 seconds.

The ideal and error curves of FIGS. 7 through 14 illustrate error in the current pulse provided to load 604 when peak voltage controller 130 is disabled.

FIGS. 15 through 25 are timing diagrams generated with peak voltage controller 130 enabled to provide adjustments for peak voltage errors. FIGS. 15 through 22 include curves for ideal conditions in which power commands 638 are configured to provide desired load pulses (blue curves). FIGS. 15 through 22 further include curves for non-deal conditions in which power commands 638 are issued to provide 10% less power than needed to achieve the desired pulses, and for which peak voltage controller 130 provides correction for peak voltage discrepancies (green curves).

Each of FIGS. 15 through 22 is addressed below.

Figure 15:
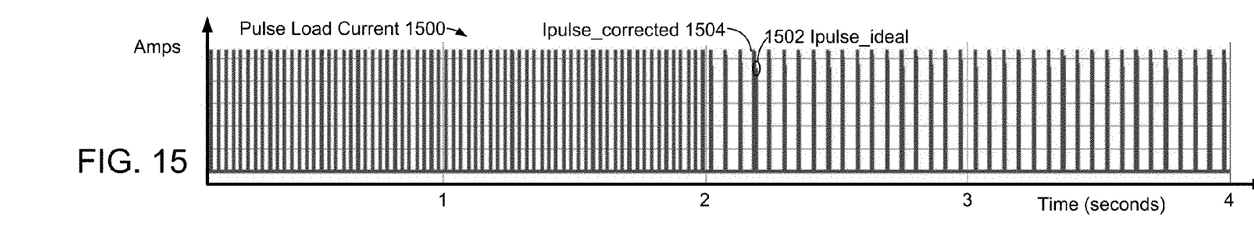
FIG. 15 is a timing diagram of pulse load current for the simulator environment of FIG. 6, with the peak voltage controller enabled.

FIG. 15 is a timing diagram 1500 of pulse load current, including an Ipulse_ideal 1502 and an Ipulse_corrected 1504.

Figure 16:
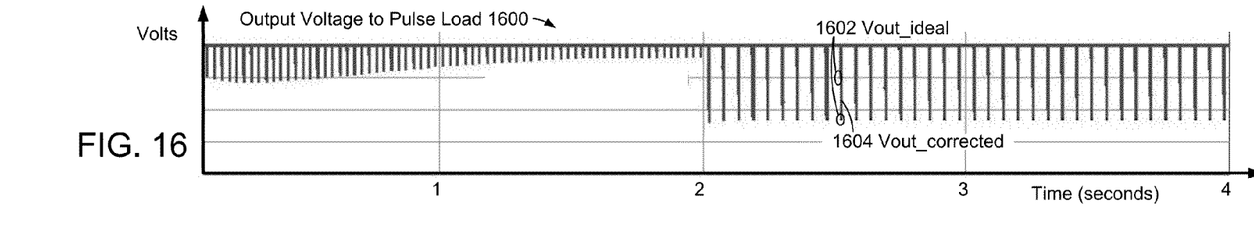
FIG. 16 is another timing diagram of output voltage to pulse load for the simulator environment of FIG. 6, with the peak voltage controller enabled.

FIG. 16 is a timing diagram 1600 of output voltage to pulse load, including a Vout_ideal 1602 and a Vout_corrected 1604.

Figure 17:
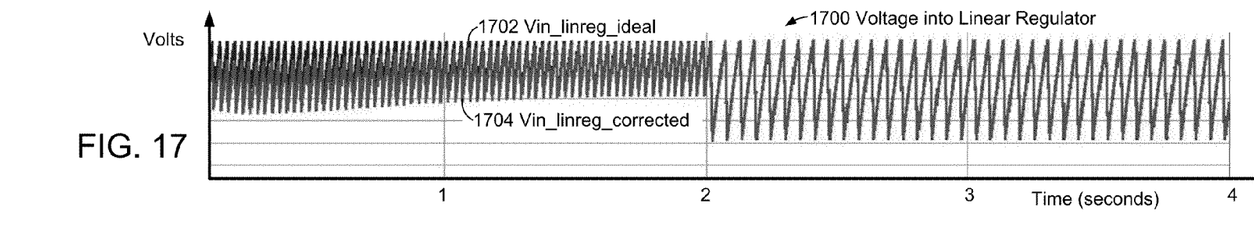
FIG. 17 is another timing diagram of voltage into linear regulator for the simulator environment of FIG. 6, with the peak voltage controller enabled.

FIG. 17 is a timing diagram 1700 of voltage into linear regulator, including a Vin_linreg_ideal 1702 and a Vin_linreg_corrected 1704.

Figure 18:
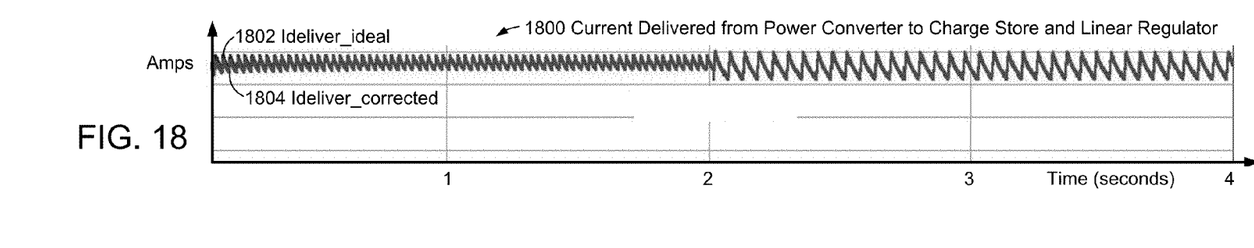
FIG. 18 is a timing diagram of current delivered from power converter to charge store and linear regulator for the simulator environment of FIG. 6, with the peak voltage controller enabled.

FIG. 18 is a timing diagram 1800 of current delivered from power converter to charge store and linear regulator, including an Ideliver_ideal 1802 and an Ideliver_corrected 1804.

Figure 19:
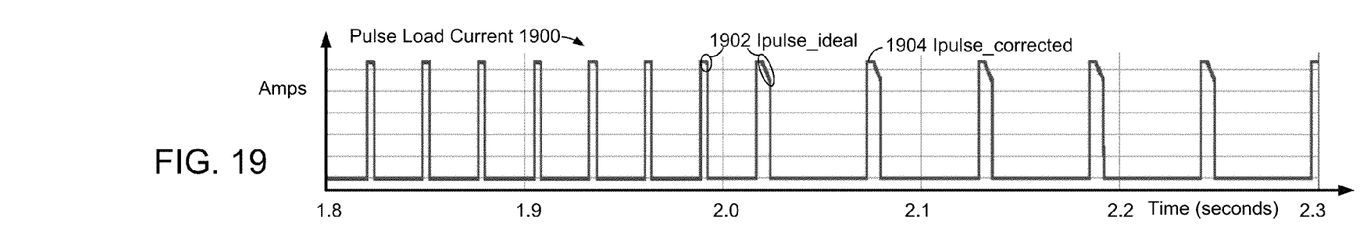
FIG. 19 is an expanded view of the timing diagram of FIG. 15.

FIG. 19 is an expanded view of timing diagram 1500, centered about pulse profile transition time t=2.017 seconds.

Figure 20:
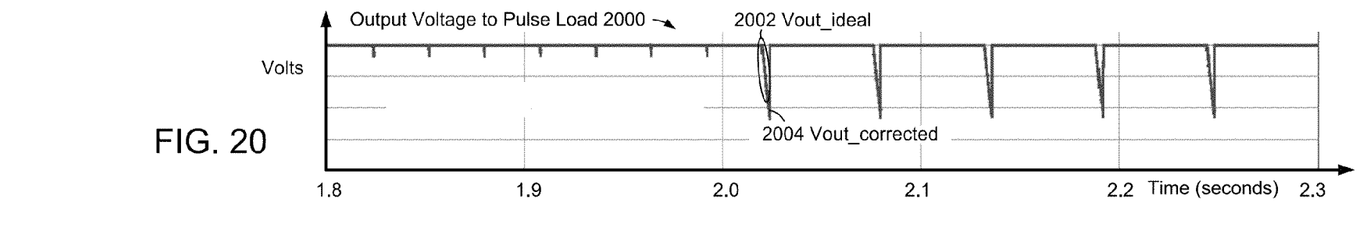
FIG. 20 is an expanded view of the timing diagram of FIG. 16.

FIG. 20 is an expanded view of timing diagram 1600, centered about pulse profile transition time t=2.017 seconds.

Figure 21:
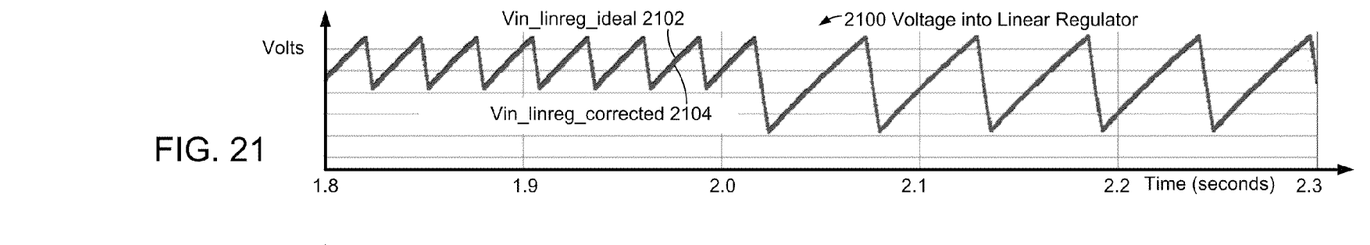
FIG. 21 is an expanded view of the timing diagram of FIG. 17.

FIG. 21 is an expanded view of timing diagram 1700, centered about pulse profile transition time t=2.017 seconds.

Figure 22:
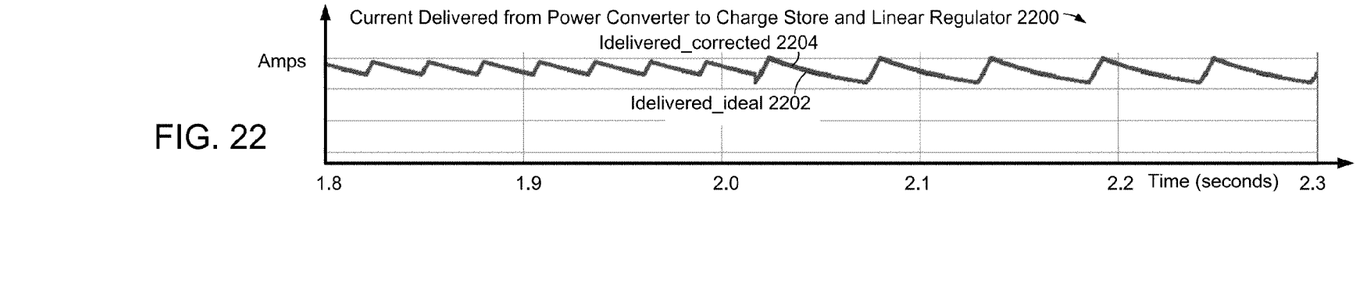
FIG. 22 is an expanded view of the timing diagram of FIG. 18.

FIG. 22 is an expanded view of timing diagram 1800, centered about pulse profile transition time t=2.017 seconds.

It can be seen from FIGS. 15 through 22 that, after about 1 second, the power command has been adjusted to correct for peak voltage error and the corrected curves match the ideal curves.

It can further be seen from FIGS. 15 through 22 that, at time 2.017 seconds when the second power command is issued with the 10% error, the adjustment command is already at the correct value and no error is seen for the second set of pulses. The 10% instantaneous error is an exaggeration of real operational conditions, because variations due to temperature or aging will typically occur relatively slowly over time rather than instantaneously. FIGS. 15 through 22 thus illustrate that methods and systems disclosed herein may be implemented to adjust the power command in a time period of about one second to correct for an instantaneous application of a command with a 10% error.

Figure 23:
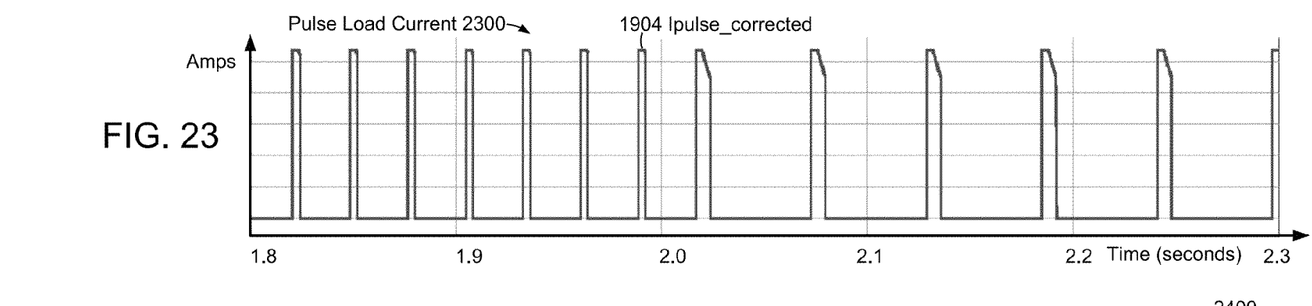
FIG. 23 is timing diagram of FIG. 19.
Figures 24, 25:
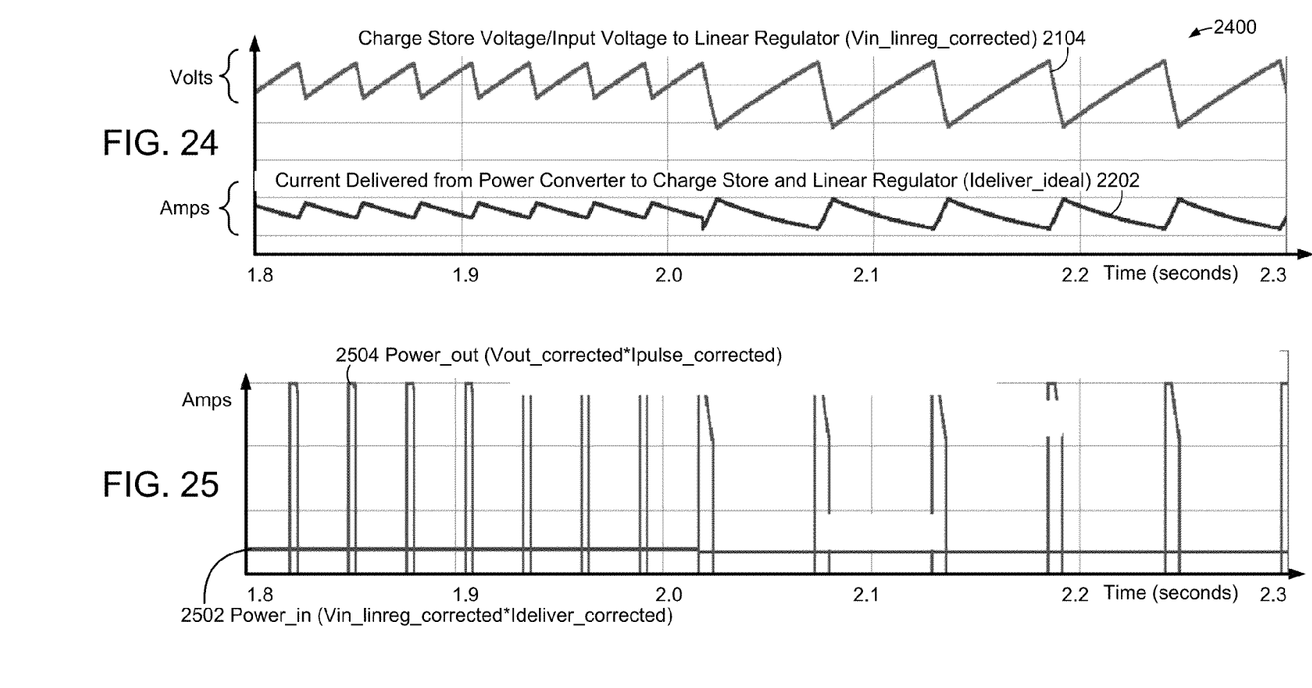
FIG. 24 is a timing diagram of current delivered from power converter to charge store and linear regulator, from FIG. 22, and charge store voltage/input voltage to linear regulator, from FIG. 21.
FIG. 25 is a timing diagram of input power levels and output power levels for the simulator environment of FIG. 6, with the peak voltage controller enabled.

FIGS. 23, 24, and 25 are timing diagrams to contrast power delivered to the pulse load and power drawn from the input power source, from t=1.8 seconds to t=2.3 seconds.

FIG. 23 is a timing diagram 2300 of pulse load current, including Ipulse_corrected 1904 of FIG. 19.

FIG. 24 is a timing diagram 2400, including current delivered from power converter to charge store and linear regulator (Ideliver_ideal) 2202 of FIG. 22, and charge store voltage/input voltage to linear regulator (Vin_linreg_corrected) 2104 of FIG. 21.

FIG. 25 is a timing diagram 2500, including Power_out 2504, determined as (Vout_corrected)*(Ipulse_corrected). Timing diagram 2500 further includes Power_in 2502, determined as (Vin_linreg_corrected)*(Ideliver_corrected).

FIGS. 23 through 25 illustrate a stable and constant power draw.

FIGS. 7 through 25 were generated with control loop bandwidths of a DC/DC converter and linear regulator 612 modeled as infinite. In practice, some power ripple may be drawn from the power source, which will be determined by the loop bandwidths.

Figure 26:
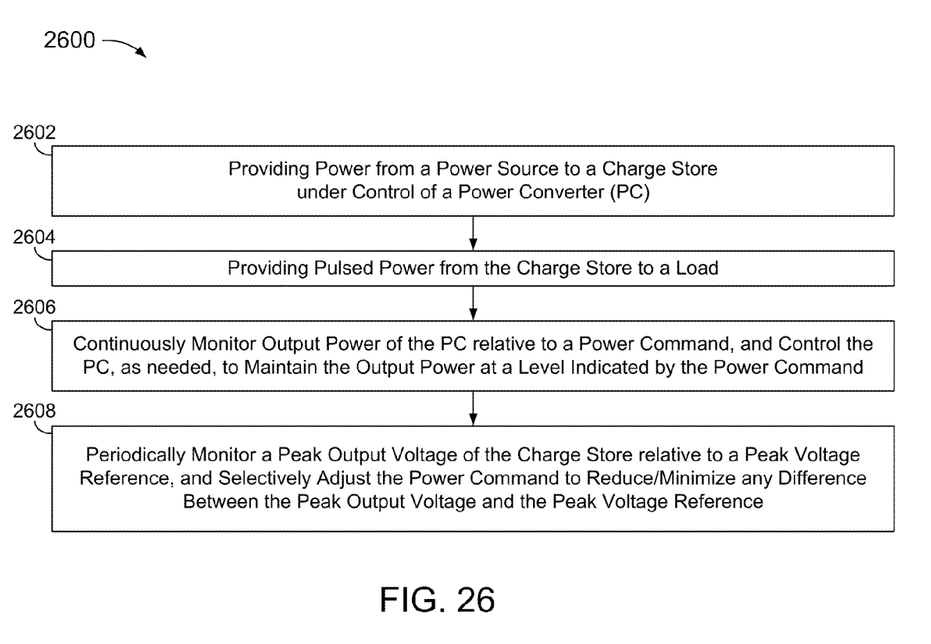
FIG. 26 is a flowchart of a method of converting a pulse power demand to a constant power demand.

FIG. 26 is a flowchart of a method 2600 of converting a pulse power demand to a constant power demand. Method 2600 may be implemented with system 100 as described in one or more examples herein. Method 2600 is not, however, limited to the examples of system 100.

At 2602, power is provided from a source to a charge store, under control of a power converter (PC), such as described above with respect to charge store 108 and PC 106.

At 2604, pulsed power is provided from the charge store to a load, such as described above with respect to charge store 108 and load 104.

At 2606, output power of the PC is continuously monitored relative to a power command, and the PC is controlled as needed to maintain the output power at a level indicated by the power command, such as described above with respect to CPC 116.

The continuous monitoring and controlling at 2606 may include dividing a sensed output voltage of the charge store by the power command to provide a current command, determining a difference between the current command and a sensed output current of the power converter, and adjusting an output current command to the power converter, as needed, to reduce and/or minimize any difference.

At 2608, a peak output voltage of the charge store is periodically monitored relative to a peak voltage reference, and the power command is selectively adjusted (i.e., adjusted as needed) to reduce and/or minimize any difference between the peak output voltage and the peak voltage reference, such as described above with respect to peak voltage controller 130.

The periodically adjusting at 1606 may include determining the peak output voltage of charge store based on the sensed output voltage of the charge store at times of synchronization pulses.

The synchronization pulses may be generated from the rising edges of a sensed pulse current provided to the load. Alternatively, the synchronization pulses may be provided by a control system associated with the load.

The periodically monitoring and selective adjusting at 2608 may be performed at a frequency of the pulsed power provided to the load, or a lower frequency.

The selective adjusting at 2608 may include varying an adjustment and/or selecting one of multiple step-sizes based on a magnitude of the difference between the peak output voltage and the peak voltage reference, such as described above with reference to FIG. 4.

Returning to FIG. 1, system 100 may be implemented as a forward voltage mode converter with peak current mode control. System 100 is not, however, limited to forward voltage mode converters. Rather, system 100 may be implemented with one or more of a variety of converter topologies and/or with an average current mode control.

PC 106 and VR 112 represent corresponding first and second stages of a two-stage power topology, which may be similar to a power factor correction (PFC) design that utilizes two power stages. For a PFC function, an input current is shaped to match a sinusoidal input voltage, mimicking a current profile of a resistor thereby producing a high power factor. In order to achieve input characteristics of a resistor, the output voltage of the first power stage has a high sinusoidal ripple component, and the second power stage provides a regulated voltage to the load. Methods and systems disclosed herein may be implemented to provide similar characteristics as a PFC in that the current draw mimics that of a resistor. Since the radar system 104 is powered by DC voltage, the desired current is DC, even though a load profile of radar system 104 includes relatively large pulse currents. As with a PFC design, the output voltage of charge store 108 (i.e., the voltage at 110), may also be relatively large. For a radar application, the delta voltage or delta charge provides an energy reservoir to support the pulse load.

A constant power draw from power source 102 may also be achieved by replacing PC 106 with a relatively large inductor and capacitor filter. In such a situation, PC controller 114 may permit the large inductor to be omitted, without alteration of charge store 108, provided that VR 122 is not altered. Elimination of the inductor may provide weight and size savings. For high power radar systems with low pulse repetition frequencies, the size of this inductor is typically very large and heavy, elimination of which may provide significant savings in weight and size.

One or more features disclosed herein may be implemented in hardware, software, firmware, and combinations thereof, including discrete and integrated circuit logic, field programmable gate arrays (FPGAs), application specific integrated circuit (ASIC) logic, and microcontrollers, and may be implemented as part of a domain-specific integrated circuit package, and/or a combination of integrated circuit packages.

Software may include a computer readable medium encoded with a computer program including logic or instructions to cause a processor to perform one or more functions in response thereto. The computer readable medium may include a transitory and/or non-transitory medium. The processor may include a general purpose instruction processor, a controller, a microcontroller, and/or other instruction-based processor.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the examples disclosed herein.

What is claimed is:

1. A system to convert power from a power source to a pulse load, comprising:
   a charge store to provide pulsed power to a load;
   a power converter to continuously provide power from a power source;
   a power converter controller to continuously compare a sensed output voltage of the charge store and a sensed output current of the power converter to a power command, and to continuously control the power converter based on the comparison to maintain an output power of the power converter constant and equal to a power level indicated by the power command; and
   a peak voltage controller to periodically compare a peak output voltage of the charge store to a peak voltage reference, and to adjust the power command based on the comparison,
   wherein the peak voltage controller includes a peak voltage detector to determine the peak output voltage based on the sensed output voltage of the charge store at times that coincide with synchronization pulses.

2. The system of claim 1, wherein the power converter controller includes:
   a divider to divide the sensed output voltage by the power command to provide a current command;
   a subtractor to determine a difference between the current command and the sensed output current; and
   a current compensator to provide an output current command to the power converter to reduce the difference between the current command and the sensed output current of the power converter.

3. The system of claim 2, wherein:
   the power converter includes a switch-based regulator to regulate the output current of the power converter based on the output current command; and
   the system further includes a pulse width modulator to control the switch-based regulator with pulse width modulation based on the output current command.

4. The system of claim 1, wherein the peak voltage controller includes synchronization circuitry to generate the synchronization pulses based on rising edges of a sensed pulse current provided to the load.

5. The system of claim 1, wherein the peak voltage controller is configured to compare the peak output voltage to the peak voltage reference at a frequency of the pulsed power provided to the load.

6. The system of claim 1, wherein the peak voltage controller is configured to vary an adjustment step size based on a magnitude of the difference between the peak output voltage and the peak voltage reference.

7. A system to convert power from a power source to a pulse load, comprising:
   a charge store to provide pulsed power to a load;
   a power converter to continuously provide power from a power source;
   a power converter controller to continuously compare a sensed output voltage of the charge store and a sensed output current of the power converter to a power command, and to continuously control the power converter based on the comparison to maintain an output power of the power converter constant and equal to a power level indicated by the power command; and
   a peak voltage controller to periodically compare a peak output voltage of the charge store to a peak voltage reference, and to adjust the power command based on the comparison,
   wherein the peak voltage controller is configured to adjust the power command by one of multiple step-sizes based on a magnitude of a difference between the peak output voltage and the peak voltage reference.

8. The system of claim 7, wherein the peak voltage controller is further implemented to compare the peak output voltage to multiple reference values, each associated with a corresponding one of the step-sizes.

9. A method of converting power from a power source to a pulse load, comprising:
   continuously providing power from a power source to a charge store under control of a power converter;
   providing pulsed power from the charge store to a load;
   continuously comparing a sensed output voltage of the charge store and a sensed output current of the power converter to a power command; and
   continuously controlling the power converter based on the comparison to maintain an output power of the power converter constant and equal to a power level indicated by the power command, and
   periodically comparing a peak output voltage of the charge store to a peak voltage reference, and adjusting the power command when a difference between the peak output voltage of the charge store and the peak voltage reference exceed a threshold,
   wherein the periodically comparing is performed at a frequency of the pulsed power provided to the load.

10. The method of claim 9, wherein the continuously comparing includes:
    dividing the sensed output voltage of the charge store by the power command to provide a current command; and
    determining a difference between the current command and the sensed output current of the power converter.

11. The method of claim 10, wherein the continuously controlling includes:
    controlling an output current of the power converter to reduce the difference between the current command and the sensed output current of the power converter.

12. The method of claim 8, wherein the periodically comparing includes determining the peak output voltage based on the sensed output voltage of the charge store at times that coincide with synchronization pulses.

13. The method of claim 12, wherein the periodically comparing further includes generating the synchronization pulses based on rising edges of a sensed pulse current provided to the load.

14. The method of claim 8, wherein the adjusting includes varying an adjustment step size based on a magnitude of the difference between the peak output voltage and the peak voltage reference.

15. The method of claim 8, wherein the adjusting includes adjusting the power command by one of multiple step-sizes based on a magnitude of the difference between the peak output voltage and the peak voltage reference.

16. The method of claim 15, wherein the adjusting further includes comparing the peak output voltage to multiple reference values, each associated with a corresponding one of the step-sizes.

\* \* \* \* \*